(12) United States Patent
Wilson

(10) Patent No.: US 11,713,210 B2
(45) Date of Patent: Aug. 1, 2023

(54) DRIVE STRUCTURE FOR TAPE OR CHALK REELS

(71) Applicant: APEX BRANDS, INC., Apex, NC (US)

(72) Inventor: Cecil Mckinley Wilson, Sanford, NC (US)

(73) Assignee: APEX BRANDS, INC., Apex, NC (US)

(*) Notice: Subject to any disclaimer, the term of this patent is extended or adjusted under 35 U.S.C. 154(b) by 0 days.

(21) Appl. No.: 17/800,429

(22) PCT Filed: Mar. 3, 2021

(86) PCT No.: PCT/US2021/020641
§ 371 (c)(1),
(2) Date: Aug. 17, 2022

(87) PCT Pub. No.: WO2021/178515
PCT Pub. Date: Sep. 10, 2021

(65) Prior Publication Data
US 2023/0081691 A1   Mar. 16, 2023

Related U.S. Application Data

(60) Provisional application No. 62/985,187, filed on Mar. 4, 2020.

(51) Int. Cl.
*B44D 3/38* (2006.01)
*B65H 75/44* (2006.01)
*G01B 3/1005* (2020.01)

(52) U.S. Cl.
CPC .......... *B65H 75/4492* (2013.01); *B44D 3/38* (2013.01); *G01B 3/1005* (2013.01);
(Continued)

(58) Field of Classification Search
CPC .... B65H 75/4492; B44D 3/38; G01B 3/1005; G01B 2003/1025
See application file for complete search history.

(56) References Cited

U.S. PATENT DOCUMENTS 2,455,819 A   12/1948  Smith
5,470,029 A * 11/1995  Dufour .................... B44D 3/38
                                               242/405

(Continued)

FOREIGN PATENT DOCUMENTS

CN   109804219 A   5/2019

OTHER PUBLICATIONS

International Search Report and Written Opinion of International Application No. PCT/US2021/020641 dated May 24, 2021, all enclosed pages cited.

(Continued)

*Primary Examiner* — Sang K Kim
(74) *Attorney, Agent, or Firm* — Burr & Forman LLP

(57) ABSTRACT

A drive assembly for a tool with a rotatable crank and a reel may include a carrier operably coupled to the reel, a stress relief plate interposed between the carrier and the crank and configured to operably couple the carrier to the crank, and mating surfaces disposed on the carrier, the stress relief plate, and the crank in a stacked arrangement to distribute stresses and increase maximum torque capacity of the drive assembly.

18 Claims, 9 Drawing Sheets

(52) U.S. Cl.
CPC .... *B65H 2403/61* (2013.01); *B65H 2701/357* (2013.01); *G01B 2003/1025* (2013.01)

(56) References Cited

U.S. PATENT DOCUMENTS

| | | | | |
|---|---|---|---|---|
| 5,718,056 | A | * | 2/1998 | Miyasaka ............ G01B 3/1005 242/395.1 |
| 6,134,801 | A | * | 10/2000 | Miyasaka ............ G01B 3/1005 242/381.5 |
| 6,477,785 | B1 | | 11/2002 | Hsu |
| 9,815,320 | B2 | * | 11/2017 | Khangar .................. B44D 3/38 |
| 10,245,881 | B2 | | 4/2019 | Khangar et al. |
| 2009/0151484 | A1 | | 6/2009 | Mullen et al. |
| 2016/0167425 | A1 | | 6/2016 | Chernyshou et al. |

OTHER PUBLICATIONS

Office Action from corresponding Chinese Application No. 202180018046.4 dated Apr. 3, 2023, all pages cited in its entirety.

\* cited by examiner

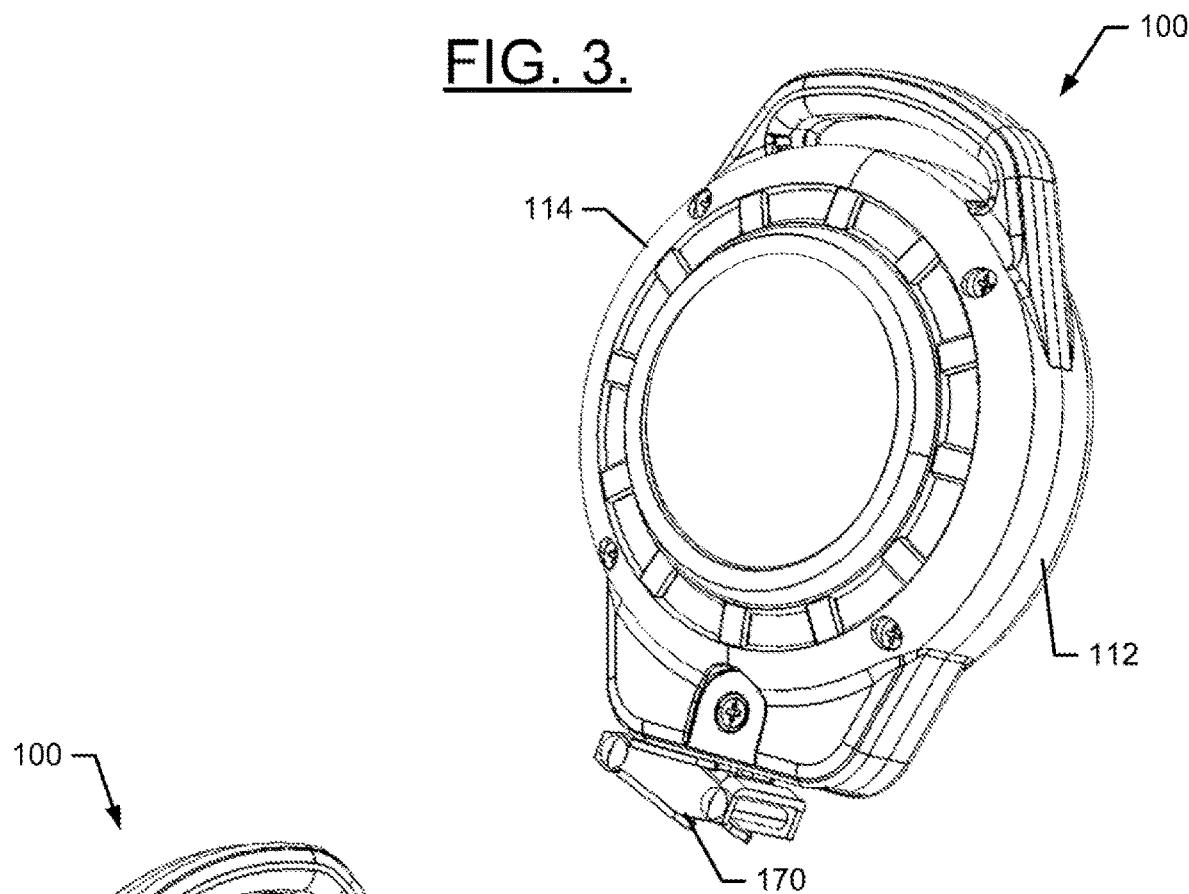
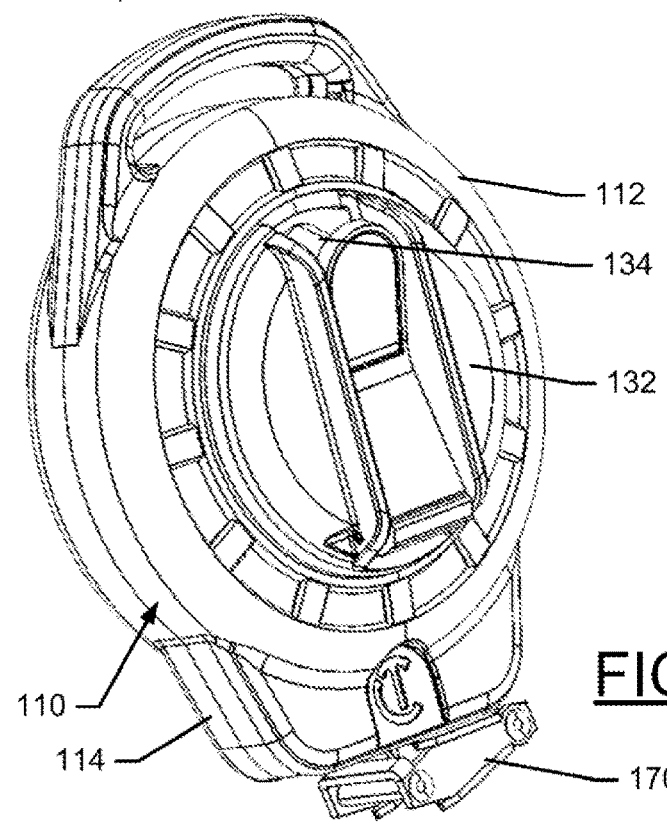

DRIVE STRUCTURE FOR TAPE OR CHALK REELS

TECHNICAL FIELD

Example embodiments generally relate to a tape measuring devices or chalk boxes, and more particularly relate to such devices having an improved drive structure.

BACKGROUND

Long tape measuring devices typically have lengths so long (e.g., greater than 25 or 50 feet) that a spring-based or other automatic retraction assembly is either not possible or not desirable. Thus, these devices typically have a flexible and flat tape (e.g., made of fiberglass or other materials) that is wound onto a reel or reel assembly. An end hook is affixed to the distal end of the tape, and can be pulled, thereby extracting tape from the reel assembly, to place the end hook at a first point that is distant from a second point near which the remainder of the tool will be retained. Alternatively, the end hook could be affixed to the first point and the remainder of the tool can be moved to the second point while withdrawing tape from the reel assembly. In either case, the end hook retains the tape at the first point, and the user may make measurements, using markings provided on the tape, along a line between the first and second points. After measuring is complete, the user often operates a rotatable handle that is operably coupled to the reel assembly to retract the tape back onto the reel or drum thereof.

Chalk boxes operate similarly in relation to extending and retracting line onto a reel assembly. However, chalk boxes generally use line instead of tape, and the line is exposed to chalk dust in a reservoir that is refillable. The chalk dust can then be applied via snapping or plucking the line, but is otherwise paid out, retained at an anchor point, reeled in, and retained on the reel assembly similar to the description above.

The processes described above, and the tools adapted for performing the processes, are both very old. However, equally old in relation to these tools, is the fact that the conventional design for the tools provides crank and reel assemblies that are made of plastic or other such materials, and that a common failure mode is for the drive structure (e.g., a drive square) associated with a crank or hub for operating the reel assembly can be stripped, sheared off, or otherwise strip the socket into which the drive structure seats.

BRIEF SUMMARY OF SOME EXAMPLES

Some example embodiments may enable the provision of tape or chalk reels that have an improved design, which is more robust. Accordingly, the disadvantages discussed above may be overcome, and the failure modes mentioned above may be avoided.

In an example embodiment, a tool is provided. The tool may include a housing having an aperture, a reel assembly disposed in the housing and having a reel, a retraction assembly, and a drive assembly. The reel may be configured to receive a flexible and extendible media wound onto the reel and capable of being extended through the aperture. The retraction assembly may include a rotatable crank and may be configured to interface with the reel to enable the flexible and extendible media, after extension from the housing, to be wound onto the reel responsive to rotation of the crank. The drive assembly may be configured to operably couple the reel to the crank via a stress relief plate disposed between mating surfaces of the drive assembly.

In another example embodiment, a drive assembly for a tool with a rotatable crank and a reel may be provided. The drive assembly may include a carrier operably coupled to the reel, a stress relief plate interposed between the carrier and the crank and configured to operably couple the carrier to the crank, and mating surfaces disposed on the carrier, the stress relief plate, and the crank in a stacked arrangement to distribute stresses and increase maximum torque capacity of the drive assembly.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

FIG. 2 illustrates a front view of a measuring device in accordance with an example embodiment;

FIG. 3 illustrates a rear view of a measuring device in accordance with an example embodiment;

Figure 8C:
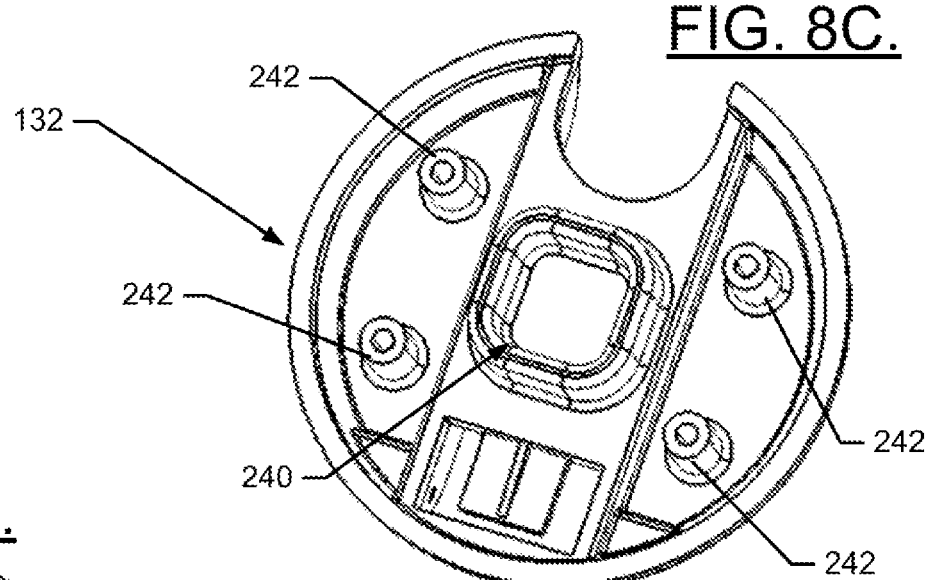
FIG. 8A is a front perspective view of a crank of a drive assembly in accordance with an example embodiment.
Figure 8B:
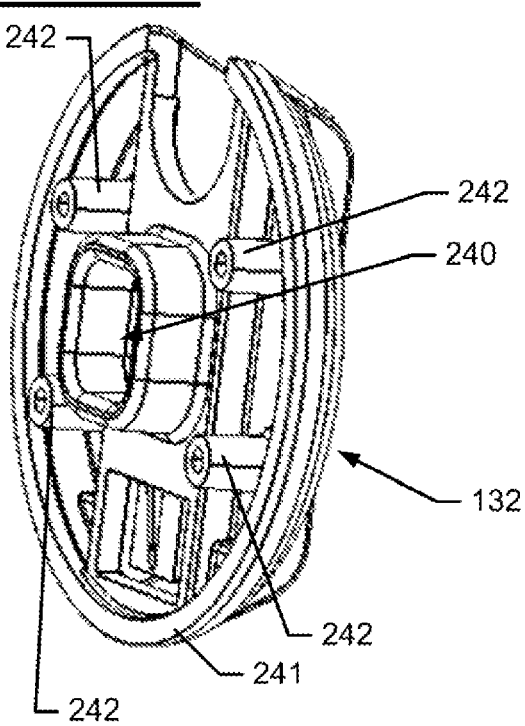
Figure 8A:
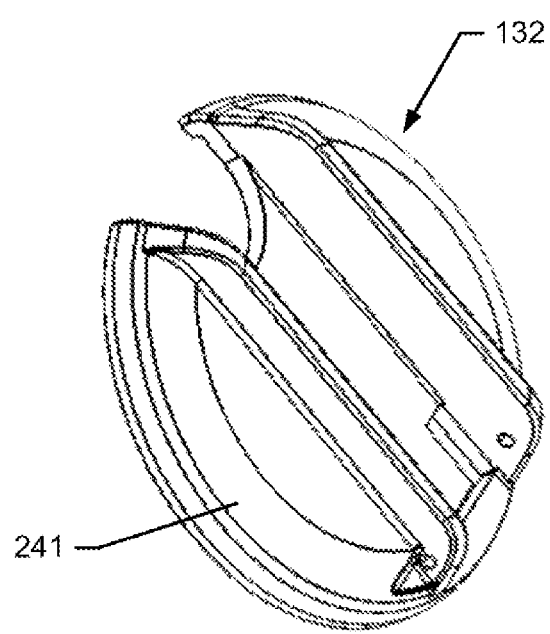
Figure 9:
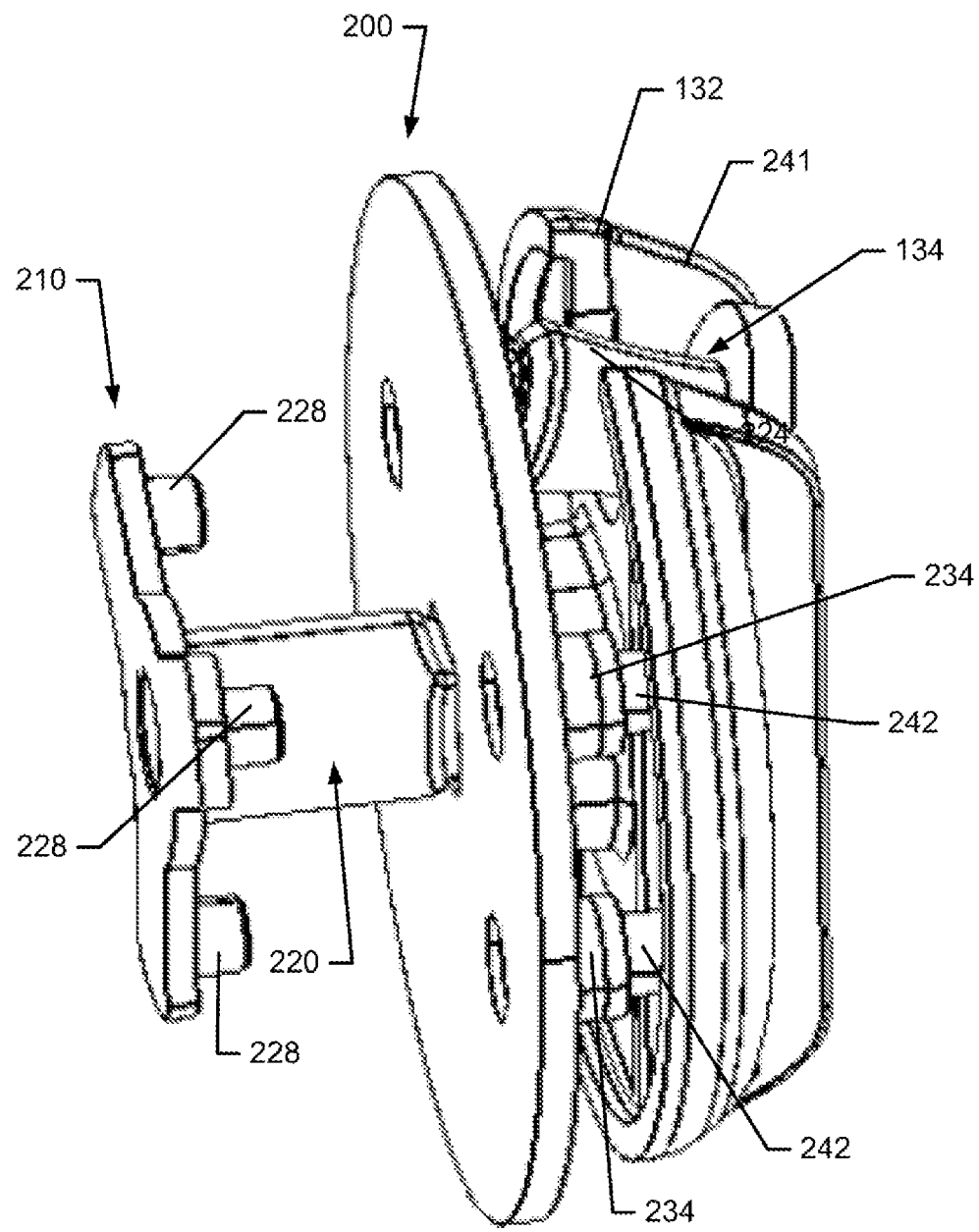
Figure 10:
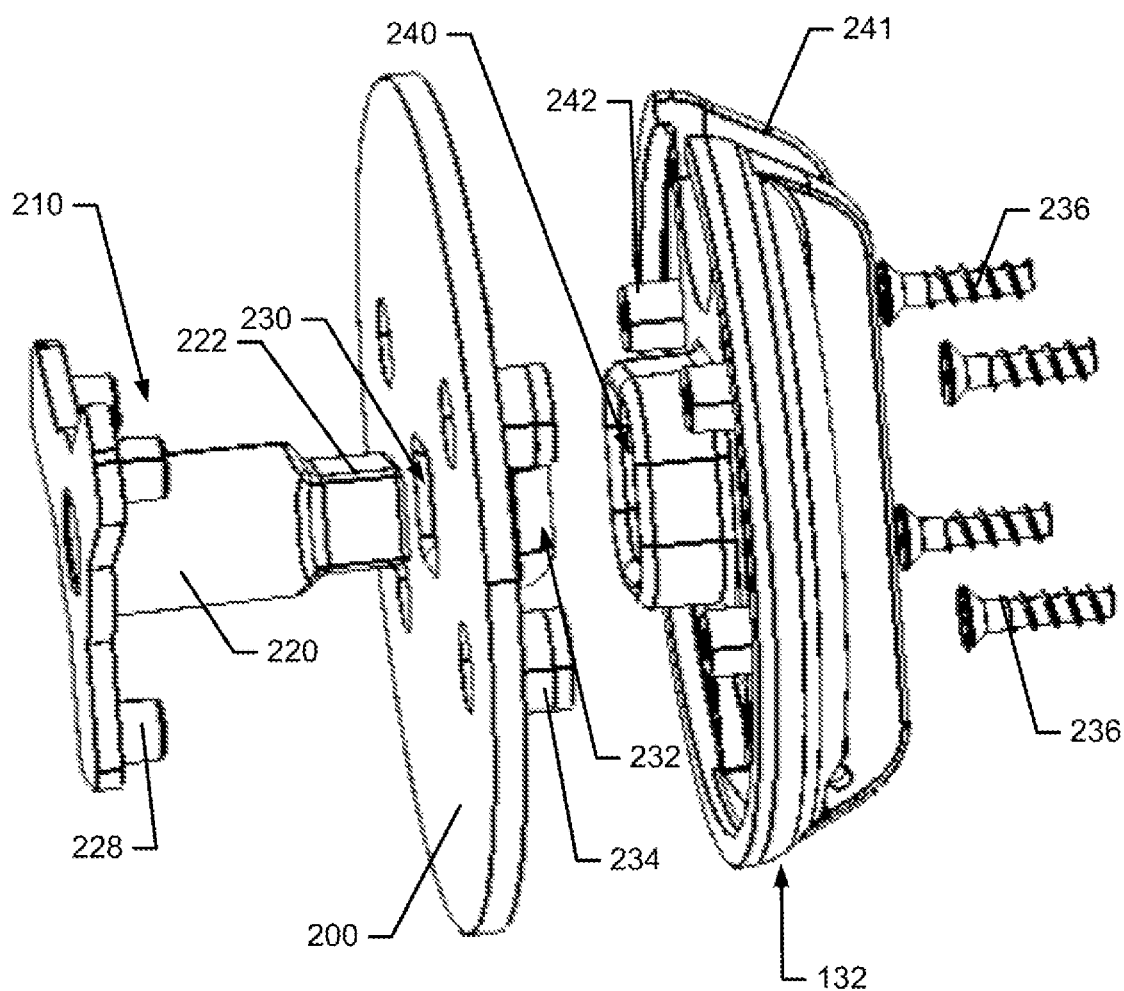

FIG. 8B and FIG. 8C each illustrate rear perspective views of the crank in accordance with an example embodiment;

FIG. 9 illustrates a side perspective view of the crank, the stress relief plate and the carrier assembled in accordance with an example embodiment; and FIG. 10 is an exploded, perspective view of the crank, the stress relief plate and the carrier in accordance with an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Figure 1:
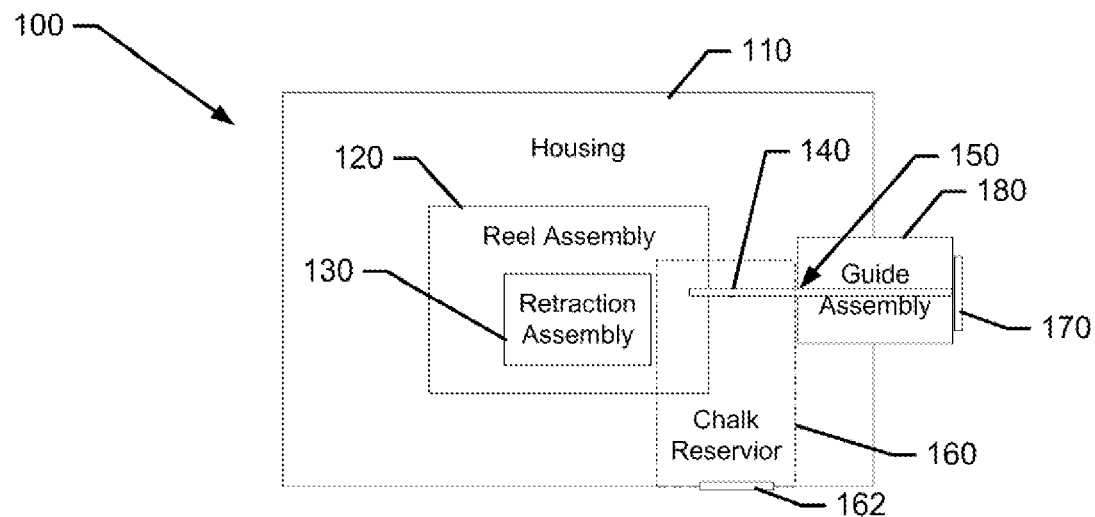
FIG. 1 illustrates a block diagram of a tool in accordance with an example embodiment.

As indicated above, some example embodiments may relate to the provision of a tool (e.g., a chalk box or a long tape measuring device) that may have an improved design for the retraction assembly. This may also, and advantageously, be accomplished using a design that can be injection molded to simplify the design and reduce costs associated therewith. FIG. 1 illustrates a block diagram of a tool 100 in accordance with an example embodiment, and FIGS. 2 and 3 illustrate front and rear views, respectively, of the tool 100.

Referring now to FIGS. 1-3, the tool 100 of an example embodiment may include a housing 110 comprising a first case half 112 and a second case half 114. The first and second case halves 112 and 114 may house a reel assembly 120 and a retraction assembly 130 therein. A flexible and extendible media (e.g., tape 140) may be wound onto the reel assembly 120 and may be alternately withdrawn from and retracted back onto the reel assembly 120. The retraction back onto the reel assembly 120 may be accomplished via the retraction assembly 130, which may include a crank 132 and a foldable knob 134 that is folded in to nest inside a portion of the crank 132 proximate to the first case half 112, and folded out in order to enable the user to turn the crank 132 about an axis of the reel assembly 120. When the knob 134 is folded out and turned, the reel assembly 120 may be configured to rotate either once for each rotation of the crank 132, or multiple times (dependent upon the configuration of the retraction assembly 130). In this regard, in some cases, the retraction assembly 130 may include a hub that is operably coupled to the crank 132, and that rotates and is operably coupled to a gear assembly that may provide multiple rotations of a drum or reel of the reel assembly 120 for each respective rotation of the knob 134 and the crank 132.

The tape 140 may be paid out through an aperture 150 formed in a portion of the housing 110. The aperture 150 may be formed to be slightly larger than a length and width of the tape 140. The tape 140 may therefore be retained on the reel assembly 120 before passing out the aperture 150. The tape 140 may also include an end hook 170 disposed at one end thereof, and the tape 140 is affixed to the reel assembly 120 at the other end of the tape 140. The end hook 170 may be affixed (temporarily) to an anchor point on a medium or surface that is to be marked. Once the end hook 170 is affixed to the anchor point, the tape 140 may be paid out of the aperture 150 and unwound from the reel assembly 120. When a desired length of the tape 140 has been paid out, the user can make any necessary measurements using the tape 140 as described above. The end hook 170 may then be released from the anchor point, and the crank 132 and knob 134 may be used to operate the retraction assembly 130 to wind the tape 140 back onto the reel assembly 120 by drawing the tape 140 back into the housing 110 via the aperture 150.

The tape 140 is flat and non-metallic (e.g., fiberglass ribbon or cloth), and is one example of a flexible and extendible media that could be used in example embodiments. Moreover, the tape 140 may be associated with situations in which the tool 100 is embodied as a long measuring tape device (e.g., having greater than 25 feet of tape 140). However, example embodiments could also be applied where the tool 100 is a chalk box. In such cases, the flexible and extendible media may instead be referred to as a line or string, and the line may be exposed to chalk in a chalk reservoir 160 (shown in dashed lines in FIG. 1 to illustrate the alternative and/or optional nature thereof). If employed, the aperture 150 may be formed to be slightly larger than a diameter of the line, and may further house or retain a filter or wiping member, such as a piece of felt or other material that prevents excess escape of chalk from a chalk reservoir 160 that is exposed to the line while the line is inside the housing 110, and also removes excess chalk from the line as the line is withdrawn from the housing 110. The felt may be held in place by a retaining wire or other structure. The line may therefore pass through or be retained in the chalk reservoir 160 before passing out the aperture 150. In an example embodiment, the chalk reservoir 160 may include a plug 162 that is accessible from outside the housing 110 to be removed to enable refilling of the chalk reservoir 160. The plug 162 of this example is located at a bottom portion of the housing 110, but other locations for the plug 162 are also possible.

Although the tool 100 may be a chalk box or measuring tape device, the figures that follow will be described in reference to an example in which the measuring device is a long measuring tape device (e.g., having greater than 25 feet of the tape 140), and therefore the flexible and extendible media will be exemplified by the tape 140 in the discussion that follows. Whether the flexible and extendible media is line or the tape 140, the aperture 150 may be disposed at a guide assembly 180 of an example embodiment. The guide assembly 180 may be configured to prevent excessive twisting or binding of the tape 140 during winding back onto the reel assembly 120 and, in some cases, may provide seating for the end hook 170 when the end hook 170 is drawn proximate to the housing 110.

As noted above, the knob 134 may be rotated between a closed position and an open position. When in the open position, the operator or user may apply pressure to the knob 134 to rotate the crank 132 to operate the reel assembly 120 to wind the tape 140 onto a reel 122 (see FIGS. 4 and 5). The drawing of the tape 140 into the reel assembly 120 (and onto the reel 122) necessarily draws the tape 140 inwardly through the guide assembly 180. Moreover, the unwinding of the tape 140 from the reel 122 to facilitate measuring also necessarily draws the tape 140 outwardly through the guide assembly 180.

As noted above, a common failure mode for devices such as the tool 100 is for the crank 132 (which may also be referred to as a hub) of the retraction assembly 132 to interface with the reel assembly 120 via a drive square and a corresponding female drive member that receives the drive square. The drive square could be at either the crank 132 or a portion of the reel assembly 120, and the female drive member would then be at the other. In either case, due to the limitations associated with wall thicknesses that can be achieved with injection molding, either the drive square may break, be stripped, or the female drive member may be stripped out due to the high stresses created between these two components. In order to relieve some of these stresses and thereby improve the robustness of the tool 100, and the useful life thereof, example embodiments may provide for the inclusion of a stress relief plate to interface between the reel assembly 120 and the retraction assembly 130 as described in greater detail below.

Figure 4:
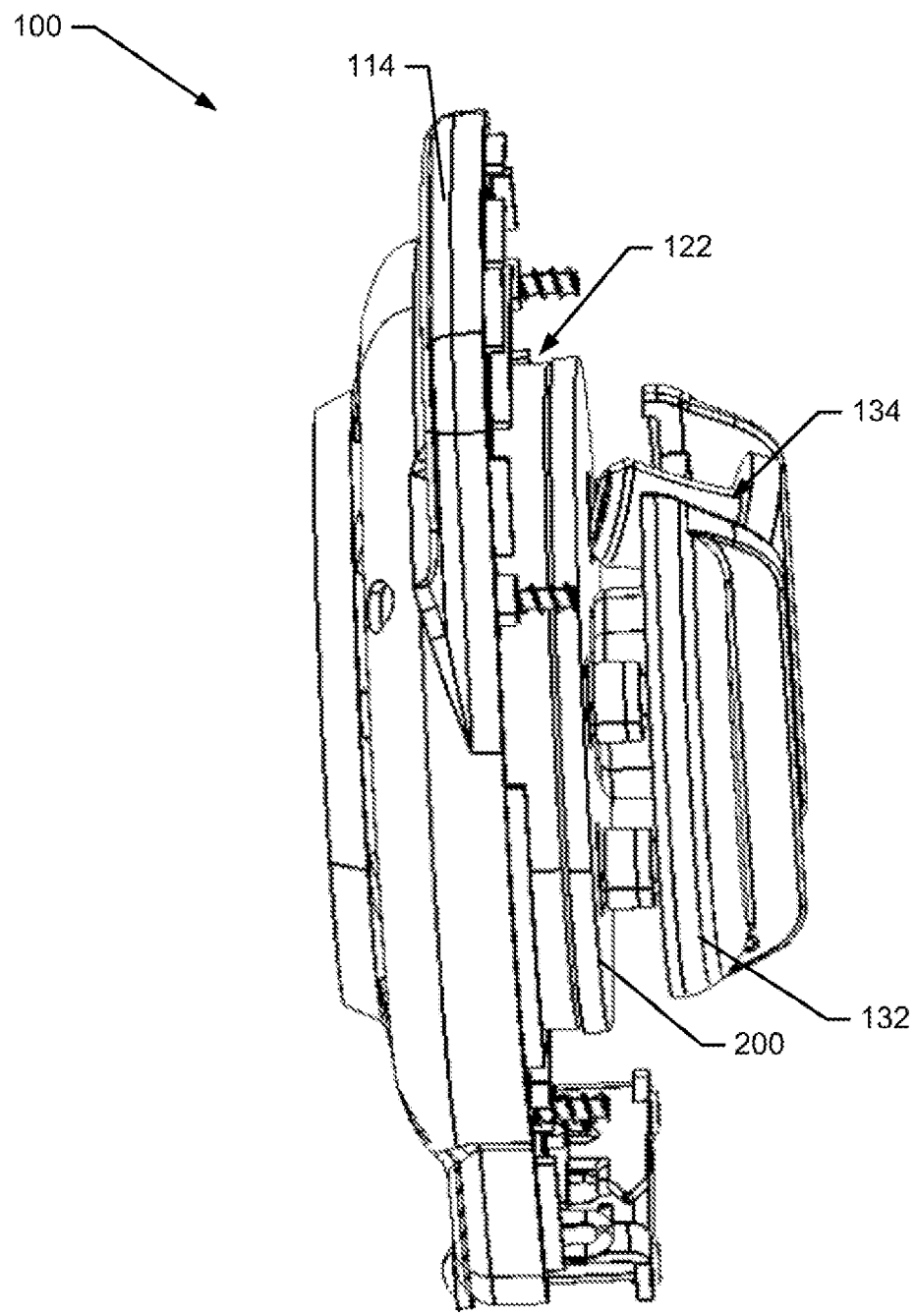
FIG. 4 illustrates a side view of the measuring device with one case half removed in accordance with an example embodiment.
Figure 5:
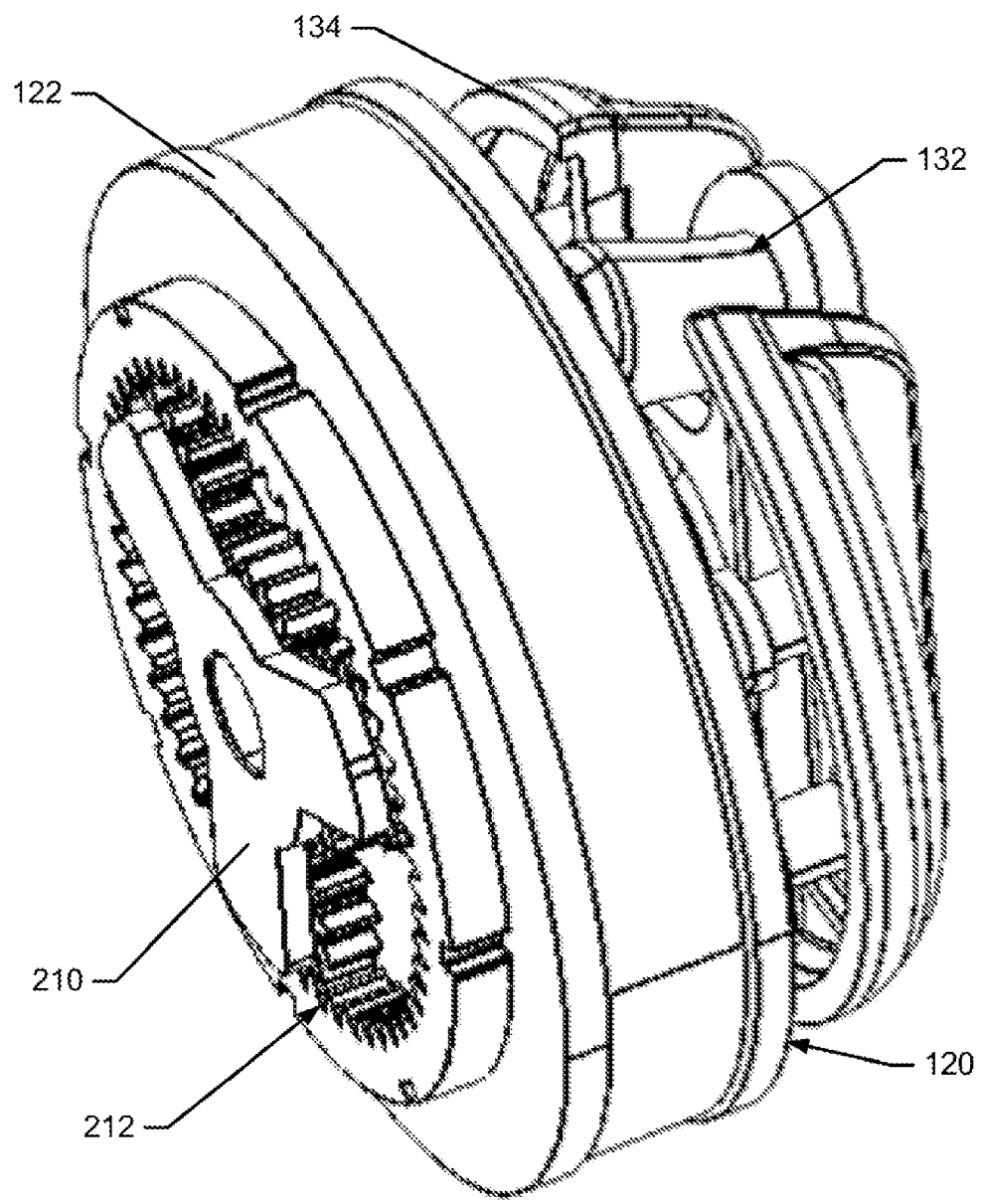
FIG. 5 illustrates a perspective view of the measuring device with both case halves removed in accordance with an example embodiment.

FIGS. 4-10 illustrate various views of the tool 100 that will be used to facilitate a description of an example embodiment. In this regard, FIG. 4 is a side view of the tool with the first case half 112 removed to illustrate an interface between the crank 132 and a stress relief plate 200 of an example embodiment. FIG. 5 shows a perspective view of portions of the retraction assembly 130 and reel assembly 120 with both the first and second case halves 112 and 114 removed. FIG. 6A illustrates a side perspective view of a carrier 210 of an example embodiment in isolation, and FIG. 6B illustrates a front perspective view thereof. FIG. 7A is a front perspective view of the stress relief plate 200 in isolation, and FIG. 7B is a rear perspective view thereof. FIG. 8A is a front perspective view of the crank 132 of an example embodiment in isolation, and FIGS. 8B and 8C each illustrate rear perspective views of the crank 132 in isolation. FIG. 9 illustrates a side perspective view of the crank 132, the stress relief plate 200 and the carrier 210 assembled in accordance with an example embodiment. FIG. 10 is an exploded, perspective view of the crank 132, the stress relief plate 200 and the carrier 210.

Referring now to FIGS. 4-10, it can be appreciated that the carrier 210 may interface directly or indirectly with the reel 122 and with the crank 132. In some cases, the carrier 210 may be referred to as a planetary carrier, due to the fact that the carrier 210 may be part of a gear assembly 212 in which the carrier 210 is operably coupled to a sun gear of the gear assembly 212 shown in FIG. 5. The sun gear may turn other gears of the gear assembly 212, and ultimately turn the reel 122 at a different (and sometimes faster) rate than the rate at which the crank 132 is turned.

Figure 6A:
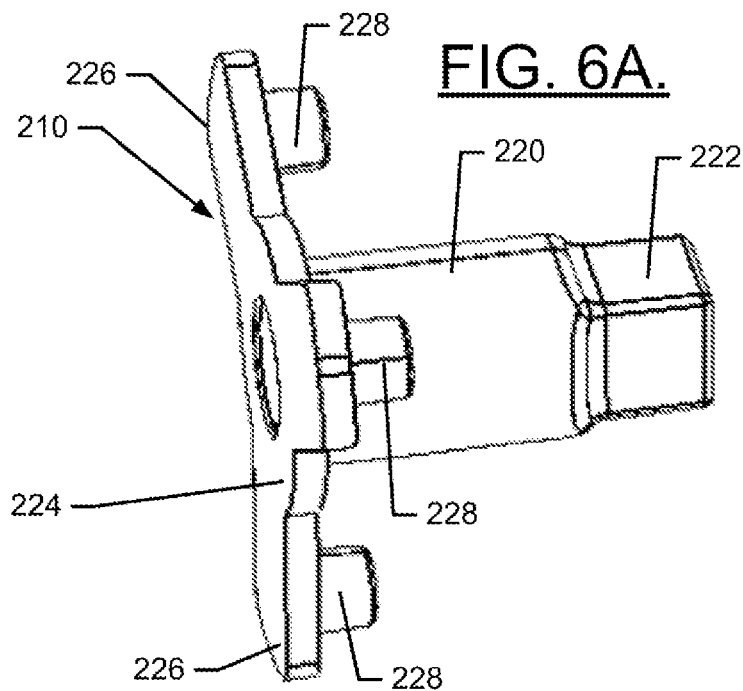
FIG. 6A illustrates a rear perspective view of a carrier of a drive assembly of the measuring device in accordance with an example embodiment.
Figure 6B:
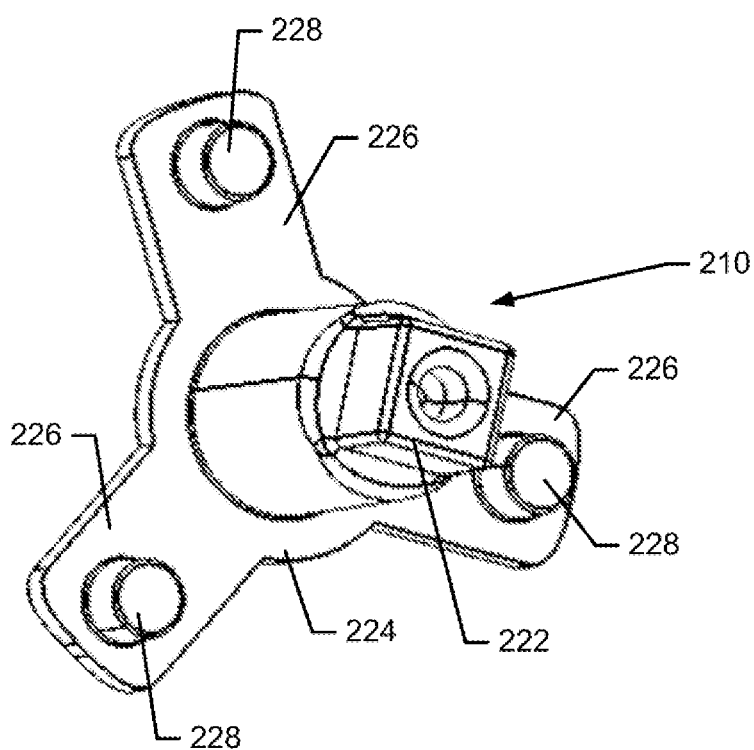
FIG. 6B illustrates a front perspective view of the carrier in accordance with an example embodiment.
Figure 7B:
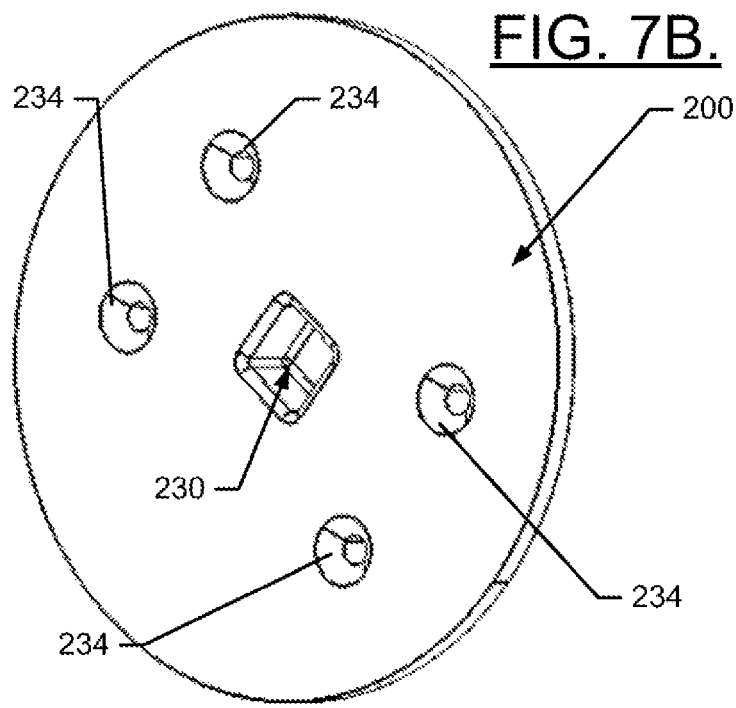
FIG. 7B illustrates a front perspective view of the stress relief plate in accordance with an example embodiment.
Figure 7A:
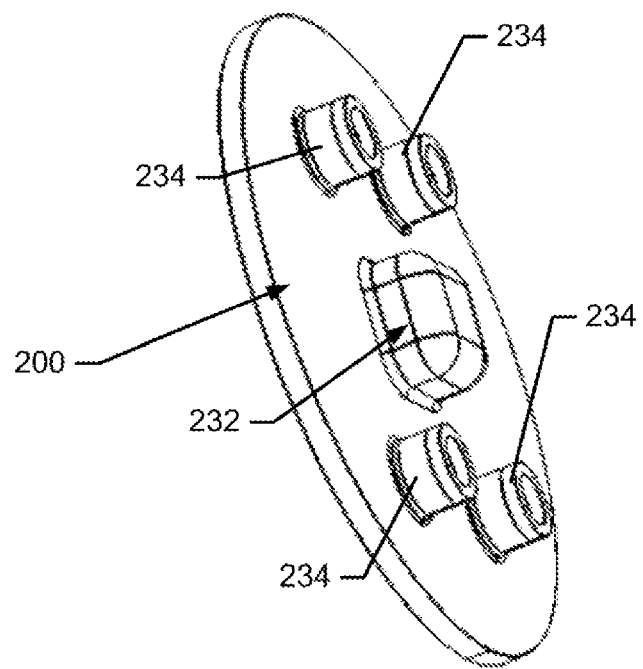
FIG. 7A illustrates rear perspective view of a stress relief plate in accordance with an example embodiment.

The carrier 210, as shown in FIGS. 6A and 6B, may include a drive projection 220 that terminates at a drive square 222. The drive projection 220 may extend substantially perpendicularly away from a base plate 224. Thus, a proximal end of the drive projection 220 may be attached to the base plate 224, and the drive square 222 may be located at a distal end of the drive projection 220. The base plate 224 in this example may include three arms 226 that extend radially outwardly from the drive projection 220. However, the base plate 224 could be circular or have any of a number of other shapes as well, or any number of arms may be included (i.e., including more or fewer than three). Regardless of the number or existence of arms 226, the base plate 224 may include reel engagement projections 228 that operably couple the carrier 210 to the reel 122. The reel engagement projections 228 may, in some cases, physically engage the reel 122 to turn the reel 122 when the carrier 210 turns. However, in this example, the reel engagement projections 228 serve as hubs about which gears of the gear assembly 212 that engages the reel 122 turn.

The drive projection 220 may be configured to extend through the reel 122 in order to engage the stress relief plate 200. In particular, the drive square 222 may engage a drive receiver 230 formed at a center of the stress relief plate 200 and shaped to fit the drive square 222. The stress relief plate 200 may be injection molded resin, and may generally be circular and plate shaped other than the drive receiver 230 formed on a side thereof that faces the carrier 210 (and the reel 122), and the corresponding drive protrusion 232 that is complementary to the drive receiver 230. In effect, the drive protrusion 232 may be a larger version of the drive square 222 that is oversized relative thereto by the thickness of the resin used to form the stress relief plate 200.

Although not required, in some cases, the stress relief plate 200 may also be provided with one or more screw bosses 234. The screw bosses 234 may be formed (again via the injection molding process) to extend perpendicularly out of the plane in which the stress relief plate 200 lies (e.g., substantially parallel to the longitudinal directions of extension of the drive receiver 230 and drive protrusion 232) and may be spaced apart from the drive protrusion 232. In this example, four screw bosses 234 are provided, but any suitable number could be employed in alternative embodiments. The screws 236 (see FIG. 10) may be engage the screw bosses 234 to the crank 132 to further reduce the stress placed on the drive square 222, the drive receiver 230, the drive protrusion 232, and reception cavity 240 formed at the crank 132.

The crank 132 may include the reception cavity 240, formed in a body 241 of the crank 132. The reception cavity 240, the drive square 222, and both the drive receiver 230 and drive protrusion 232 may all have a square cross sectional shape. Moreover, the size and shape of the reception cavity 240 may correspond to the size and shape of the drive protrusion 232, and the size and shape of the drive square 222 may correspond to the size and shape of the drive receiver 230, so that all such components stack together and fit tightly with one another. As such, the drive protrusion 232 may have a similar shape as the drive square 222, but be larger. In particular, for example, the drive protrusion 232 may have a width substantially equal to a width of the drive square 222 plus two times a wall thickness of the stress relief plate 200 (or at least two times a thickness of the stress relief plate 200 at the drive receiver 230 and drive protrusion 232. The body 241 may also include screw bosses 242 that are positioned thereon to correspond to the screw bosses 234 of the stress relief plate 200. Thus, the screws 236 may pass through the aligned screw bosses 234 and 242 of the stress relief plate 200 and crank 132, respectively, to further secure the stress relief plate 200 to the crank 132.

As noted above, the reception cavity 240, which is formed at an axis or center of the crank 132, may be sized to fit and receive the drive protrusion 232. Thus, instead of having only a single male component (e.g., the drive square 222) and a single female component (e.g., the reception cavity 240) upon which all stresses associated with rotating the crank 132 would be concentrated, example embodiments distribute the stresses over multiple components. In this regard, two male components (e.g., drive square 222 and drive protrusion 232) and two female components (drive receiver 230 and reception cavity 240) are employed to distribute the stresses. By using a plurality of female components in a stacked fashion, the effective wall thickness of the driving members may be increased. Injection molded components having nearly uniform wall thicknesses may therefore be employed, while still effectively increasing the wall thickness of the driving components to increase the torque that can be withstood by the assembly. As such, the carrier 210, the stress relief plate 210 and the crank 132 form a drive assembly that has improved maximum torque performance relative to conventional designs. Moreover, to the extent the screws 236 and screw bosses 234 and 242 are employed, the maximum torque may be increased even greater.

Thus, as can be appreciated from FIGS. 9 and 10, the carrier 210 may be operably coupled to the reel 122 (e.g., via the gear assembly 212). The carrier 210 may also be operably coupled to the stress relief plate 200 via interaction between the drive square 222 and the drive receiver 230. The stress relief plate 200 may then, in turn, be operably coupled to the crank 132 via interaction between the drive protrusion 232 and the reception cavity 240 formed at the crank 132. As such, each of the drive protrusion 232 and drive receiver 230 of the stress relief plate 200 may be considered as mating surfaces of the drive assembly along with the drive square 222 (an example of a driving or male member) and the reception cavity (an example of a driven or female member). When the knob 134 is folded out and rotated, the crank 132 will correspondingly turn about its axis. The body 241 will be carried by this rotation and correspondingly apply torque to the drive protrusion 232 via the reception cavity 240 to rotate the stress relief plate 200 (and also to the screws 236 and screw bosses 234 and 242, if employed). The rotation of the stress relief plate 200 carries the drive receiver 230, which applies torque to the drive square 222 and turns the carrier 210. Rotation of the carrier 210 is communicated to the reel 122 via the gear assembly 212, and thereby the reel 122 is turned to wind tape 140 onto the reel 122.

As noted above, the provision of two female and two male torque transmission components as the mating surfaces within the drive assembly, which is accomplished by adding the stress relief plate 200, increases maximum torque capabilities. However, it should be appreciated that the specific structures for doing so are merely one example of how this can be accomplished. Thus, it may be possible to make some modifications without departing from the spirit of the innovation described herein. For example, the ordering and arrangement of the male and female components could be reversed (i.e., so that the crank 132 has a male component or drive square, and the carrier 210 has a female component, with the orientation of the stress relief plate 200 therefore being switched. Moreover, the specific shape of the drive components and male/female members could be altered. Thus, a star shape, triangle or other geometric shapes other than squares could be employed in some cases.

As can be appreciated from the descriptions above, the first and second case halves 112 and 114, and components associated with the drive assembly can all be made by injection molding. This enables low cost and improved manufacturability. However, due to employing the strategies described herein, the stress tolerance of the drive assembly (and maximum torque performance) may be enhanced for tools such as chalk boxes and long tape measuring devices.

Moreover, other tools that are injection molded, but include an injection molded drive assembly, can also benefit from example embodiments.

In an example embodiment, a tool may be provided. The tool may include a housing having an aperture, a reel assembly disposed in the housing and having a reel, a retraction assembly, and a drive assembly. The reel may be configured to receive a flexible and extendible media wound onto the reel and capable of being extended through the aperture. The retraction assembly may include a rotatable crank and may be configured to interface with the reel to enable the flexible and extendible media, after extension from the housing, to be wound onto the reel responsive to rotation of the crank. The drive assembly may be configured to operably couple the reel to the crank via a stress relief plate disposed between mating surfaces of the drive assembly.

In some embodiments, the features of the tool described above may be augmented or modified, or additional features may be added. These augmentations, modifications and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, for example, the drive assembly may include a carrier operably coupled to the reel, and the stress relief plate may be interposed between the carrier and the crank. In an example embodiment, the carrier may be operably coupled to the reel via a gear assembly. In some cases, the carrier may extend through a portion of the reel to engage the stress relief plate on an opposite side of the reel relative to the carrier. In an example embodiment, the mating surfaces may include a drive protrusion and a drive receiver each formed at the stress relief plate. The mating surfaces may further include a driving member at one of the crank or the carrier and a driven member at the other of the crank or the carrier. The driving member may be operably coupled to the drive receiver, and the drive protrusion may be operably coupled to the driven member. In some cases, the driven member may include a reception cavity formed in a body of the crank, and the drive member may include a drive square formed at a drive projection of the carrier. In an example embodiment, the drive protrusion, the drive projection, the reception cavity and the drive square may each be aligned along a rotational axis of the crank and the reel. In some cases, the body of the crank may further include a first set of screw bosses, the stress relief plate may further include a second set of screw bosses, and the first and second sets of screw bosses may align with each other and be spaced apart from the rotational axis. In an example embodiment, the drive protrusion and the drive receiver may have complementary shapes on opposing sides of the stress relief plate. In some cases, a wall thickness of the stress relief plate may be substantially equal to a wall thickness of the driven member. In an example embodiment, the drive protrusion may have a similar shape as the drive member, but the drive protrusion may have a width substantially equal to a width of the drive member plus two times a wall thickness of the stress relief plate.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A tool comprising:
  a housing having an aperture;
  a reel assembly disposed in the housing and having a reel, the reel being configured to receive a flexible and extendible media wound onto the reel and capable of being extended through the aperture; and
  a retraction assembly comprising a rotatable crank, the retraction assembly being configured to interface with the reel to enable the flexible and extendible media, after extension from the housing, to be wound onto the reel responsive to rotation of the crank;
a drive assembly configured to operably couple the reel to the crank via a stress relief plate disposed between mating surfaces of the drive assembly,
wherein the drive assembly comprises a carrier operably coupled to the reel,
wherein the stress relief plate is interposed between the carrier and the crank, and
wherein the carrier is operably coupled to the reel via a gear assembly.

2. A tool comprising:
a housing having an aperture;
a reel assembly disposed in the housing and having a reel, the reel being configured to receive a flexible and extendible media wound onto the reel and capable of being extended through the aperture; and
a retraction assembly comprising a rotatable crank, the retraction assembly being configured to interface with the reel to enable the flexible and extendible media, after extension from the housing, to be wound onto the reel responsive to rotation of the crank;
a drive assembly configured to operably couple the reel to the crank via a stress relief plate disposed between mating surfaces of the drive assembly,
wherein the drive assembly comprises a carrier operably coupled to the reel,
wherein the stress relief plate is interposed between the carrier and the crank, and
wherein the carrier extends through a portion of the reel to engage the stress relief plate on an opposite side of the reel relative to the carrier.

3. A tool comprising:
a housing having an aperture;
a reel assembly disposed in the housing and having a reel, the reel being configured to receive a flexible and extendible media wound onto the reel and capable of being extended through the aperture; and
a retraction assembly comprising a rotatable crank, the retraction assembly being configured to interface with the reel to enable the flexible and extendible media, after extension from the housing, to be wound onto the reel responsive to rotation of the crank;
a drive assembly configured to operably couple the reel to the crank via a stress relief plate disposed between mating surfaces of the drive assembly,
wherein the drive assembly comprises a carrier operably coupled to the reel,
wherein the stress relief plate is interposed between the carrier and the crank,
wherein the mating surfaces include a drive protrusion and a drive receiver each formed at the stress relief plate,
wherein the mating surfaces further include a driving member at one of the crank or the carrier and a driven member at the other of the crank or the carrier, and
wherein the driving member is operably coupled to the drive receiver, and the drive protrusion is operably coupled to the driven member.

4. The tool of claim 3, wherein the driven member comprises a reception cavity formed in a body of the crank, and
wherein the drive member comprises a drive square formed at a drive projection of the carrier.

5. The tool of claim 4, wherein the drive protrusion, the drive projection, the reception cavity and the drive square are each aligned along a rotational axis of the crank and the reel.

6. The tool of claim 5, wherein the body of the crank further comprises a first set of screw bosses,
wherein the stress relief plate further comprises a second set of screw bosses, and
wherein the first and second sets of screw bosses align with each other and are spaced apart from the rotational axis.

7. The tool of claim 3, wherein the drive protrusion and the drive receiver have complementary shapes on opposing sides of the stress relief plate.

8. The tool of claim 7, wherein a wall thickness of the stress relief plate is substantially equal to a wall thickness of the driven member.

9. A drive assembly for a tool with a rotatable crank and a reel, the drive assembly comprising:
a carrier operably coupled to the reel;
a stress relief plate interposed between the carrier and the crank and configured to operably couple the carrier to the crank; and
mating surfaces disposed on the carrier, the stress relief plate, and the crank in a stacked arrangement to distribute stresses and increase maximum torque capacity of the drive assembly.

10. The drive assembly of claim 9, wherein the carrier is operably coupled to the reel via a gear assembly.

11. The drive assembly of claim 9, wherein the carrier extends through a portion of the reel to engage the stress relief plate on an opposite side of the reel relative to the carrier.

12. The drive assembly of claim 9, wherein the mating surfaces include a drive protrusion and a drive receiver each formed at the stress relief plate,
wherein the mating surfaces further include a driving member at one of the crank or the carrier and a driven member at the other of the crank or the carrier, and
wherein the driving member is operably coupled to the drive receiver, and the drive protrusion is operably coupled to the driven member.

13. The drive assembly of claim 12, wherein the driven member comprises a reception cavity formed in a body of the crank, and
wherein the drive member comprises a drive square formed at a drive projection of the carrier.

14. The drive assembly of claim 13, wherein the drive protrusion, the drive projection, the reception cavity and the drive square are each aligned along a rotational axis of the crank and the reel.

15. The drive assembly of claim 14, wherein the body of the crank further comprises a first set of screw bosses,
wherein the stress relief plate further comprises a second set of screw bosses, and
wherein the first and second sets of screw bosses align with each other and are spaced apart from the rotational axis.

16. The drive assembly of claim 12, wherein the drive protrusion and the drive receiver have complementary shapes on opposing sides of the stress relief plate.

17. The drive assembly of claim 16, wherein a wall thickness of the stress relief plate is substantially equal to a wall thickness of the driven member.

18. The drive assembly of claim 12, wherein the drive protrusion has a similar shape as the drive member, but the drive protrusion has a width substantially equal to a width of the drive member plus two times a wall thickness of the stress relief plate.

* * * * *